(12) United States Patent
Powell et al.

(10) Patent No.: US 7,656,585 B1
(45) Date of Patent: Feb. 2, 2010

(54) EMBEDDED RELAY LENS FOR HEAD-UP DISPLAYS OR THE LIKE

(75) Inventors: Karlton D. Powell, Lake Stevens, WA (US); Mark O. Freeman, Snohomish, WA (US); David Scott Wright, Bellevue, WA (US)

(73) Assignee: Microvision, Inc., Redmond, WA (US)

( * ) Notice: Subject to any disclaimer, the term of this patent is extended or adjusted under 35 U.S.C. 154(b) by 3 days.

(21) Appl. No.: 12/194,466

(22) Filed: Aug. 19, 2008

(51) Int. Cl.
  *G02B 27/14* (2006.01)
  *G03B 21/00* (2006.01)
  *G02F 1/1335* (2006.01)
(52) U.S. Cl. .............................. 359/630; 353/11; 349/11
(58) Field of Classification Search ......... 359/630–634, 359/13–14; 345/7, 9; 348/115; 353/11–12, 353/28, 119; 349/11; 340/438, 980, 995.1, 340/815.47, 815.74
See application file for complete search history.

(56) References Cited

U.S. PATENT DOCUMENTS

| | | | |
|---|---|---|---|
| 5,625,493 A * | 4/1997 | Matsumura et al. | 359/630 |
| 6,236,511 B1 * | 5/2001 | Brown | 359/634 |
| 2009/0059336 A1 * | 3/2009 | Dunphy et al. | 359/199 |

* cited by examiner

*Primary Examiner*—Scott J Sugarman
*Assistant Examiner*—Dawayne A Pinkney
(74) *Attorney, Agent, or Firm*—Kevin D. Wills

(57) ABSTRACT

Briefly, in accordance with one or more embodiments, an optical relay comprises a partially-reflective-coated Fresnel lens or similar low-profile lens such as a diffractive lens or a holographic lens having a first index of refraction and a filler medium having a second index of refraction and being disposed adjacent to the Fresnel lens. The optical relay enables the optical power of the Fresnel or similar low-profile lens embedded within the two layers to influence a beam that is reflected from the optical relay while allowing transmitted light to experience little or no influence from the embedded lens.

19 Claims, 6 Drawing Sheets

EMBEDDED RELAY LENS FOR HEAD-UP DISPLAYS OR THE LIKE

BACKGROUND

In a head-up display (HUD), optical design is made more complex by a design constraint to keep the optical relay lens or lenses out of the direct line of sight of the driver, pilot or viewer. Typically, meeting this design constraint results in adding a combiner or using the windshield as a combiner where the function of the combiner is to combine the image from the HUD projector with the view of the world directly in front of the driver, pilot, or viewer. The main relay optics for an automotive HUD are typically housed inside the dashboard, with the output light projected upward onto the windshield which reflects a portion of the light back towards the driver where not much space may be available, and where the optical path may be relatively complex.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 4:
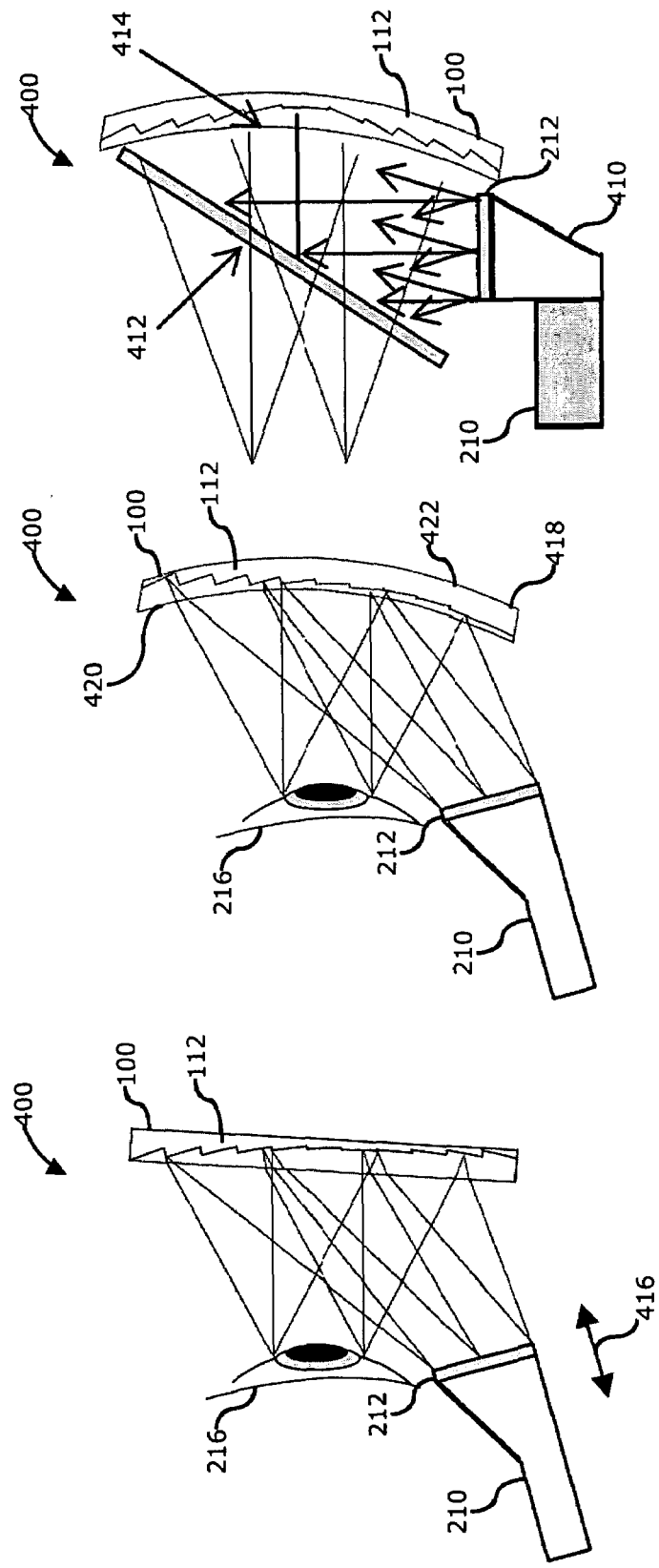
Figure 5:
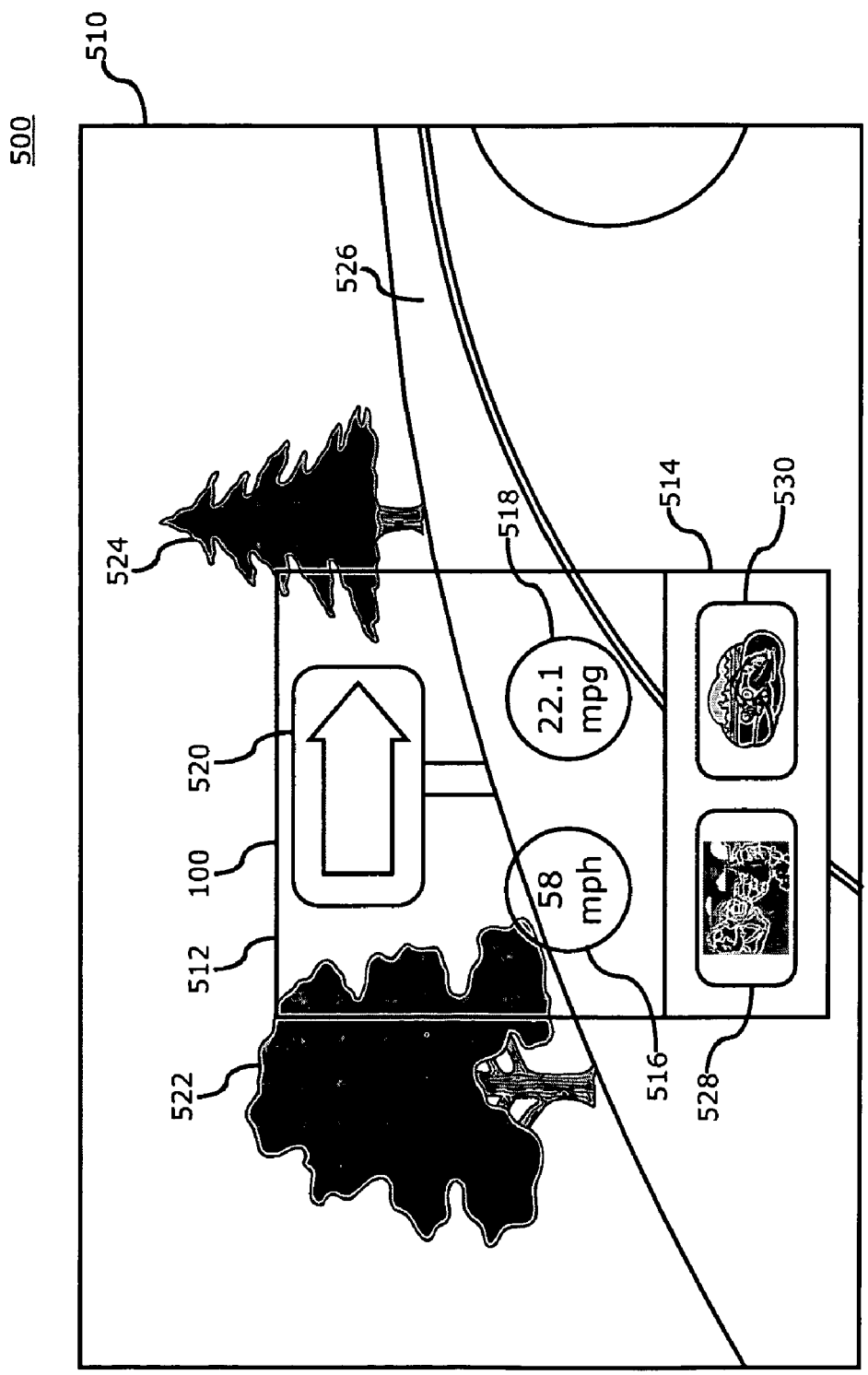
Figure 6:
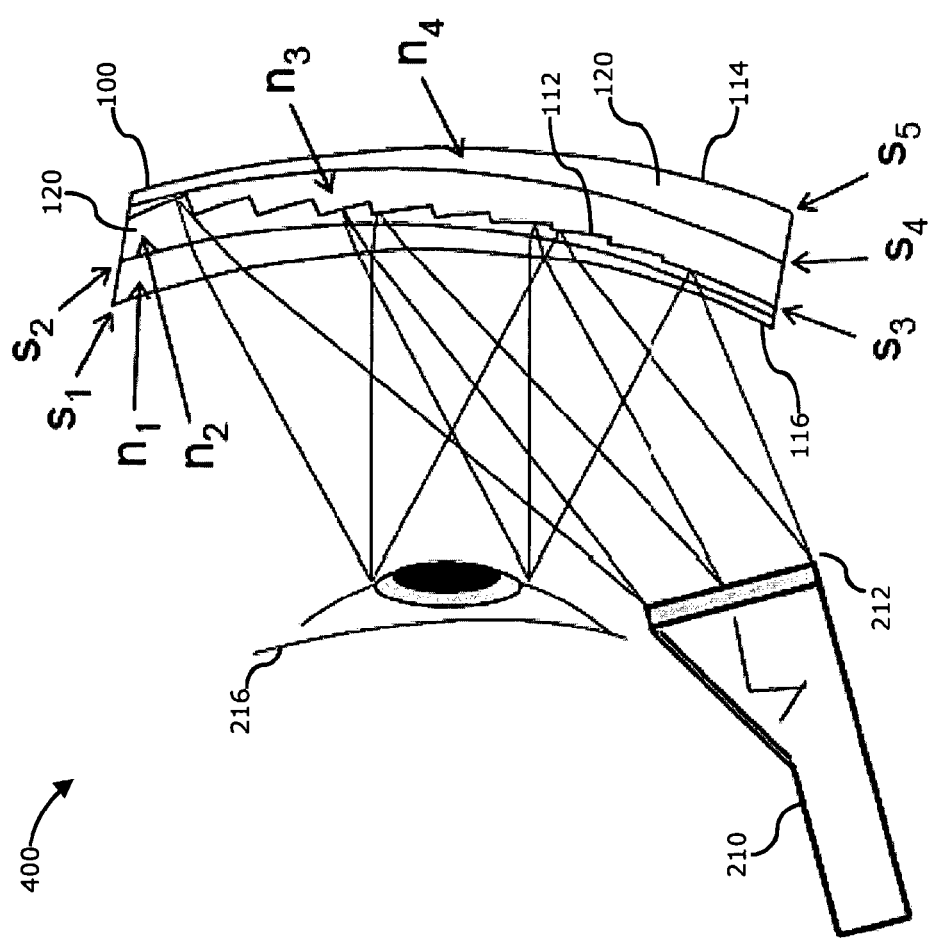

FIGS. 4A, 4B, and 4C are diagrams near-to-eye head-up display projectors utilizing an optical relay in accordance with one or more embodiments;

FIG. 5 is a diagram of a projector display system having multiple display regions in accordance with one or more embodiments;

FIG. 6 is a diagram of a projector system having an embedded, at least partially reflective Fresnel or diffractive surface or lens in which one or more surfaces may have curvature in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
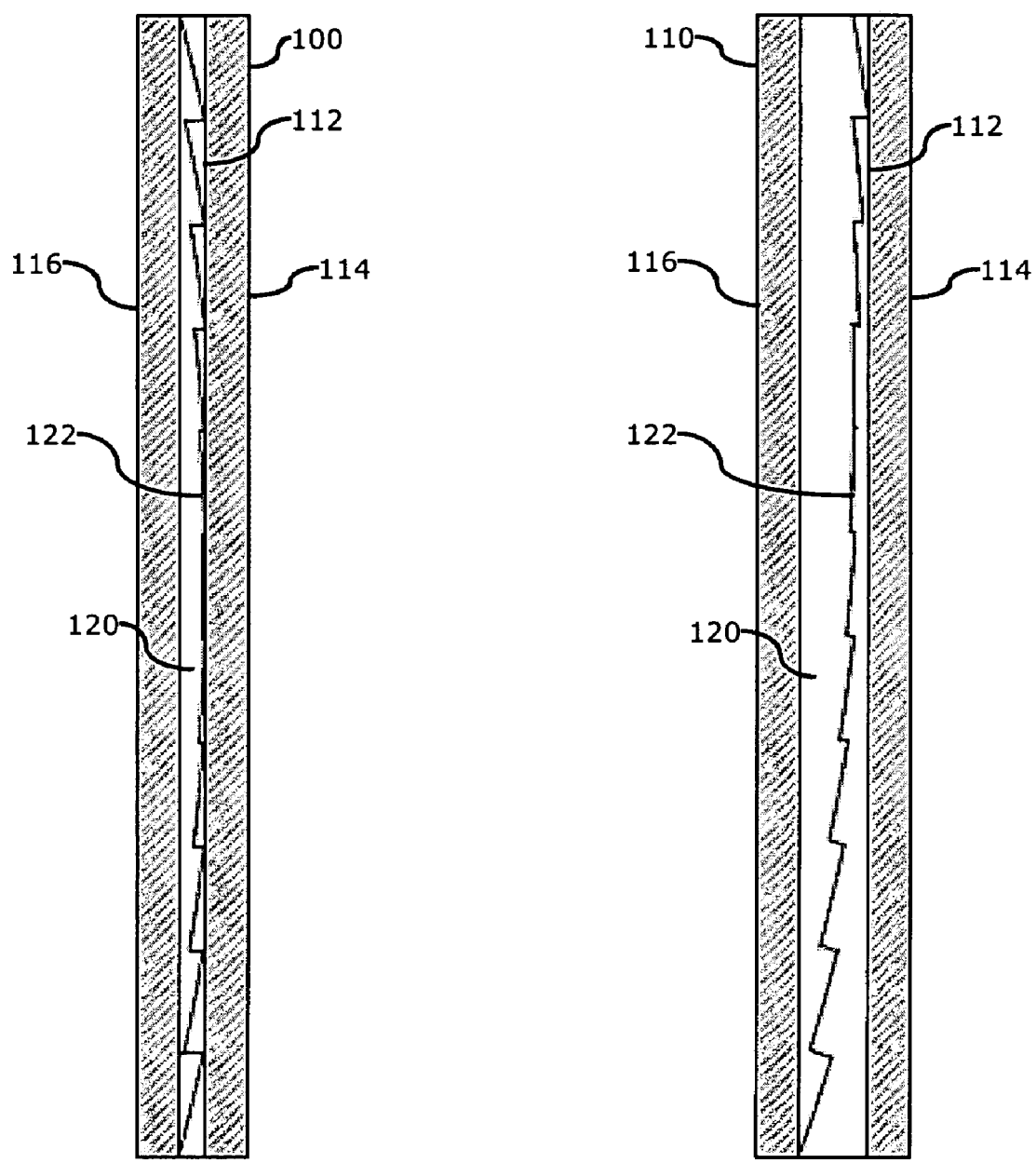
FIG. 1 is a diagram of an optical relay in accordance with one or more embodiments.

Referring now to FIG. 1, a diagram of an optical relay in accordance with one or more embodiments will be discussed. As shown in FIG. 1, an optical relay 100 may comprise a Fresnel or diffractive lens 112 disposed between a first layer 114 and a second layer 116. Although the term Fresnel lens may be used herein, it should be noted that the term may also encompass and/or be interchangeable with diffractive lens in one or more embodiments, and the scope of the claimed subject matter is not limited in this respect. In one or more alternative embodiments, Fresnel lens 112 may comprise a diffractive lens, and the scope of the claimed subject matter is not limited in this respect. In one or more embodiments, first layer 114 and/or second layer 116 may comprise a glass or plastic pane or other type of optically transparent optical material that may be rigid or flexible. Example materials may comprise, for example, glass, tempered glass, polyvinyl butyral (PVB) resin, and so on. Fresnel or diffractive lens 112 may itself comprise a glass or plastic material that is sandwiched between first layer 114 and second layer 116 as an embedded Fresnel lens, or alternatively Fresnel lens 112 may be formed on a surface of first layer 114 and/or second layer 116. Since a Fresnel lens 112 may comprise multiple surfaces 122, or Fresnel elements, optical relay 100 may include a filler 120 which may comprise an optical cement or epoxy or other suitable filler medium that is at least partially see-through and/or at least partially optically transparent. In one or more embodiments, one or more of Fresnel lens 112, first layer 114, second layer 116, and/or filler 120 may be cured via application of ultraviolet (UV) light or via temperature curing. In one or more embodiments, the surface 122 may be at least partially reflective and/or at least partially transparent, for example via an at least partially reflective coating disposed on surface 122. In one or more particular embodiments, such a coating or coatings may further be wavelength selective wherein light having a first wavelength may be reflected and light having a second wavelength may pass through the coating. Furthermore, such a coating or coatings may be polarization selective wherein light having a first polarization may be reflected or retarded, and light having a second polarization may pass through the coating. Filler material 120 may have a first index of refraction $n_1$ and Fresnel lens 112 may have a second index of refraction $n_2$. In the case of a scanned-beam display, diffractive artifacts may be reduced, minimized, and/or eliminated with optical relay 100 by designing one or more of the sections of Fresnel lens 112 to have a width and/or spacing on the order of the beamlet size, or size of a diffraction order spacing within the diffraction envelope, projected at the relay lens plane, from each exit cone emanating from each pixel of the display's exit pupil expander (EPE), or equivalently, any image plane internal to the projector, in the display projector for which optical relay is utilized, for example projector 210 of FIG. 2 or FIG. 3, below, where such widths may be, for example on the order of about 3 mm to about 6 mm or so, although the scope of the claimed subject matter is not limited in this respect.

In one or more embodiments, optical relay 100 may be utilized in a scanned-beam projector, for example a laser based scanned-beam projector. In one or more alternative embodiments, optical relay may be utilized in a non scanned-beam type projector for example a digital light projector (DLP), liquid-crystal display (LCD) type projector, and so on, and the scope of the claimed subject matter is not limited in this respect. For achieving reduced diffractive artifacts in the case of using optical relay 100 in conjunction with a laser or non-laser-based one-dimensional-scanned or two-dimensional panel display, the minimum Fresnel pitch can be estimated to be on the order of the footprint, as projected on or traced to the Fresnel relay, of the minimum cone numerical aperture (NA) representing the resolvable pixel resolution of the display panel being projected.

In one or more embodiments, the overall shape of optical relay 100 may be relatively flat or planar, or alternatively may be non-planar and have at least a slight curve on one or more surfaces thereof, where such a curvature may be spherical or aspherical, with Fresnel lens 112 having a spherical or aspherical curvature, although the scope of the claimed subject matter is not limited in these respects. In some embodiments, optical relay 100 may be a relatively thinner and optically transparent device, or alternative optical relay 110 may comprise an off-axis section of a Fresnel or diffractive lens 112 which may be a slightly thicker but still moderately thin and see-through device. Optical relay 100 and/or optical relay 110 may be a stand-alone device that is added for example in front of or behind a windshield or windscreen of a vehicle or of a helmet or other head-worn device, or alternatively optical relay 100 and/or optical relay 110 may be disposed within or otherwise formed as part of or integral with such a windshield or windscreen, and the scope of the claimed subject matter is not limited in these respects.

In one or more embodiments, optical relay 100 comprises a reflective Fresnel lens 112 having a surface 122 disposed between two refractive index media having a first index of refraction $n_1$ and a second index of refraction $n_2$, such that the ratio between $n_1$ and $n_2$ may be selected to implement a reflective and/or powered optical element. In one or more embodiments, $n_1$ may be equal to, or nearly equal to, $n_2$ although the scope of the claimed subject matter is not limited in this respect. For example, for an optical relay 100 having parallel outer surfaces of layer 114 and layer 116, having equal or nearly equal indices $n_1$ and $n_2$ allows optical relay 100 to be see-through with no magnification of a see-through image, and Fresnel or diffractive lens or reflector 112 may still have its own magnification power. In contrast, providing at least sufficiently different two indices $n_1$ and $n_2$ disposed on opposed sides of the Fresnel or diffractive lens or reflector 112 can serve to affect magnification of a see-through image while still maintaining the power of the reflective or diffractive Fresnel lens 112 Fresnel component. Such an arrangement may be contrasted with the embodiment wherein a combination of adding curvature, and thus power, to the outer surfaces of layers 114 and 116 of the element sandwich of which optical relay 100 is comprised, thereby giving a lensing affect to a see-through image, and in some cases to both a see-through as well as reflected virtual image. Such an arrangement may provide one or more additional degrees of freedom in the design and usage of optical relay 100, for example using curvature of the outer surfaces of layers 114 and 116, both on-axis and off-axis spherical, aspheric, or planar, as well as curvature of the embedded Fresnel lens 112, and/or both on and off-axis spherical and aspheric Fresnel reflector surface 112. Furthermore, in one or more embodiments it is also possible to actually have the inner surfaces of layers 114 and 116 to be curved in addition to the curvature of the outer surfaces of layers 114 and 116 so as to still allow fairly-low see-through distortion while adding a even more design degrees-of-freedom in the correction capability of the projected image. Such additional correction obtained may be greater correction than allowed by just the Fresnel lens or reflector 112 alone on the reflective system side of the element. FIGS. 4A through 4C, below show such an element, however, outer lens substrates are added to the Fresnel elements 112 shown, such as the sandwiches of layers 114 and 116, it would be further possible to design using curvature on both the inner and outer surfaces of the substrate at the same time as using an embedded Fresnel, enabling even another surface for distortion correction of the relayed image. In such an embodiment, the layer 114 or 116 disposed after the embedded Fresnel element 112 could have curvatures on both sides thereof to help regain and/or correct the see-through distortion caused by the power in the first layer, which could be a tradeoff in order to get more correction for the relayed image. In see-through optical relay 100 wherein magnification of the see-through image is provided, the extra degrees-of-freedom can be used to achieve this effect as well. An example of such an optical relay 100 is shown in and described with respect to FIG. 6, below.

Figure 2:
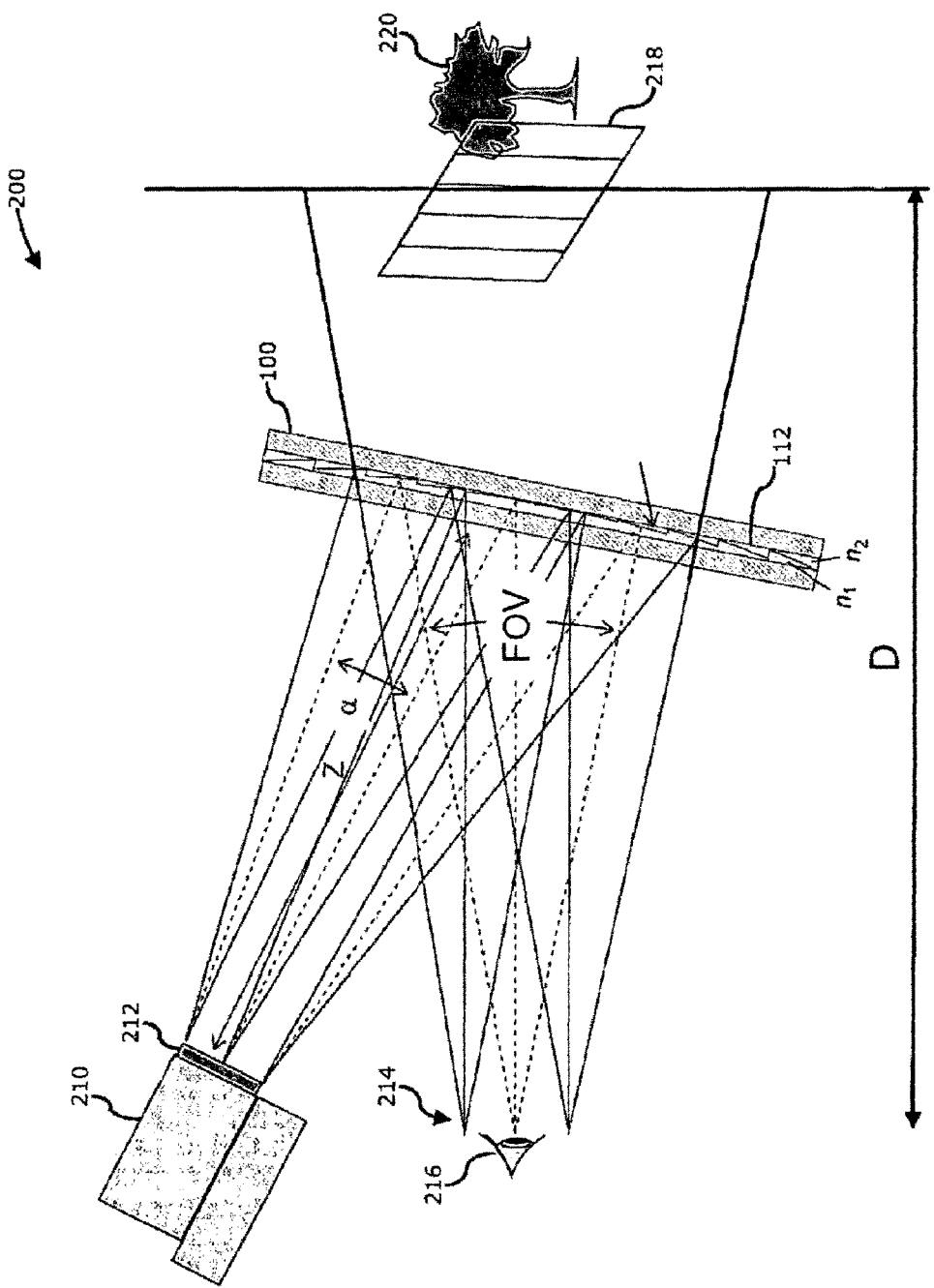
FIG. 2 is a diagram of a head-up display projector utilizing an optical relay in which the displayed image is projected generally on-axis with respect to the optical relay in accordance with one or more embodiments.
Figure 3:
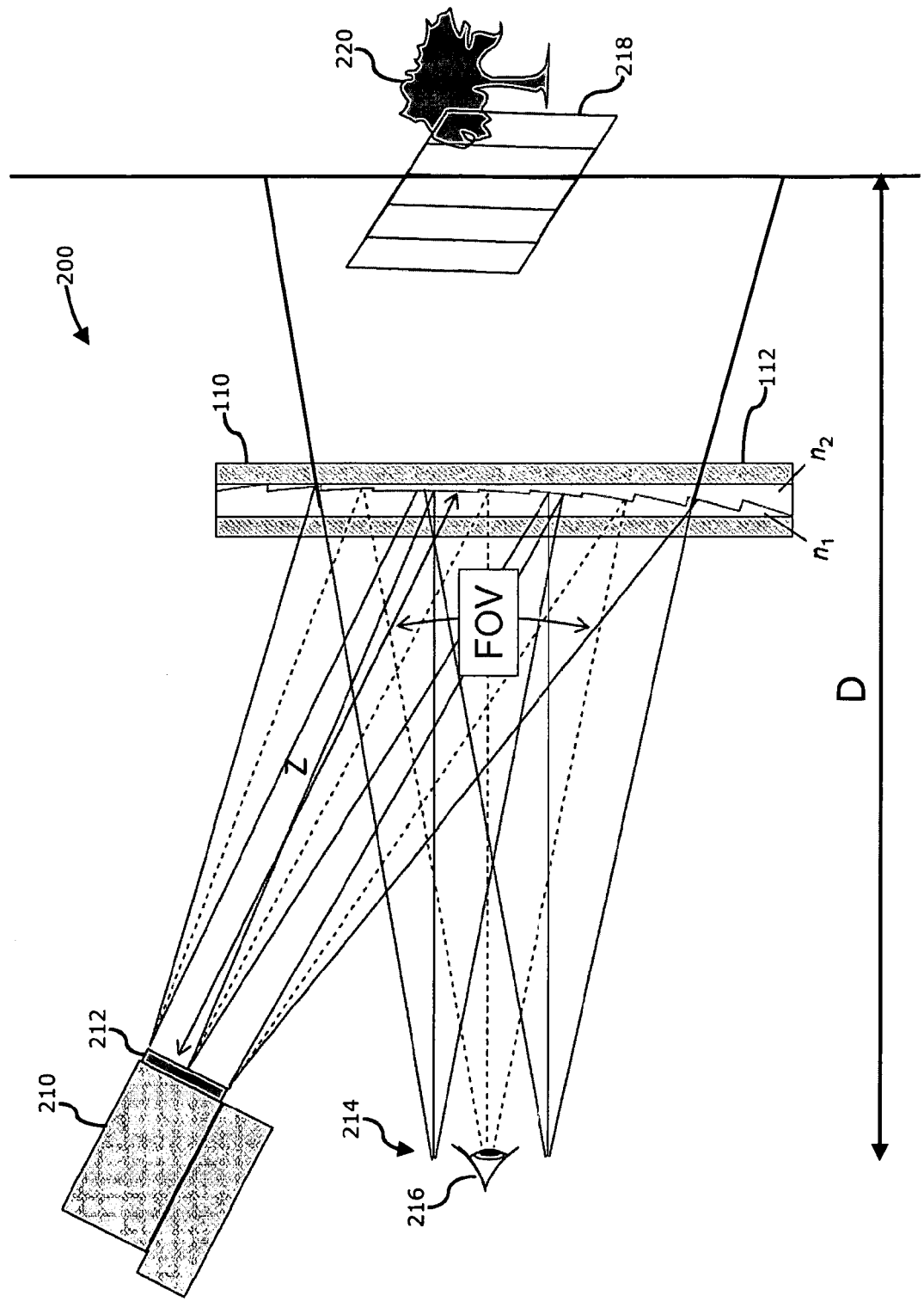
FIG. 3 is a diagram of a head-up display projector utilizing an optical relay in which the displayed image is projected generally off-axis in accordance with one or more embodiments.

In one or more embodiments, Fresnel lens or reflector 112 may be manufactured to be relatively thin and imaged in a tilted on-axis or normal-to-viewer off-axis case, for example as shown in FIG. 2 and FIG. 3, respectively. In one or more alternative embodiments, Fresnel lens 112 could similarly comprise a diffractive lens or holographic lens. A reflective coating may be disposed on a surface 122 of Fresnel lens 112 and may comprise a neutral density or a wavelength-selective notch filter such as a multi-notch Rugate coating, and/or other band-pass filter, or types of filters such as a high-pass filter or a low-pass filter suitable for use in monochrome systems. Alternatively, coating may be made reflective such as a wavelength-selective hologram. However, these are merely example coatings that may be utilized on a surface 122 of Fresnel lens 112, and the scope of the claimed subject matter is not limited in these respects.

In one or more embodiments, optical relay 100 may be capable of enabling a virtual display such that if a user looks through optical relay 100 while an image is projected onto optical relay 100, for example as shown in and described with respect to FIG. 2 and/or FIG. 3, below, the image viewable by the user may appear to be located at a distance beyond optical relay 100. Optical relay 100 thus may be displayed in such a laser or scanned beam display, and alternatively optical relay 100 may also be utilized with other types of microdisplays such as liquid-crystal displays (LCDs), digital micromirror devices, liquid-crystal on silicon (LCOS), and other types of two-dimensional (2D) displays and/or one-dimensional (1D) scanned display technologies, and the scope of the claimed subject matter is not limited in these respects.

In one or more embodiments, optical relay 100 having Fresnel lens 112 may be generally constructed as follows. Fresnel lens 112 may comprise a surface 122 embedded between adjacent media of refractive index $n_1$ and $n_2$. Outer layers of adjacent media comprising first layer 114 and second layer 116 may be either planar or non-planar. In one or more embodiments, surface 122 of Fresnel lens 112 may have a reflective coating, or an at least partially reflective coating, disposed thereon. An effective focal length of Fresnel lens 112 may be at least defined by a Fresnel surface profile of the Fresnel elements of which Fresnel lens is composed and the refractive index of the media adjacent to the Fresnel surface. In one or more embodiments, such a Fresnel surface profile of Fresnel lens 112 may be spherical, aspherical, anamorphic, on-axis or off-axis, and so on. If the refractive indices of Fresnel lens 112 and filler 120 are set such that $n_1$ is approximately equal $n_2$, Fresnel lens 112 is essentially see through, or nearly see through, with no power for the portion of light that originates from the opposite side of optical relay with respect to the side which the viewer is viewing, while the light from a projector may be imaged and relayed toward the viewer's eye. Furthermore, in one or more embodiments, if the indices are not set to be sufficiently equal or nearly equal, in such an arrangement optical relay 100 may achieve magnification of the background image while simultaneously viewing virtual overlay content projected from the projector.

In one or more embodiments, polarization coatings and/or retarders may be applied to various surfaces of optical relay 100, for example on surface 122 of Fresnel lens 112, and/or one or more surfaces of first layer 114 and/or second layer 116, and/or on a surface of a windshield or windscreen with which optical relay 100 is utilized, to enable various polarization input versus output relationships, so as to allow, for example, compatibility of optical relay 100 with the viewer's sunglasses, and so on. In addition, optical relay 100 may include various other coatings, layers, and/or surfaces, for example selective, reflective, absorptive, and/or polarization coatings or surfacing, which optionally may be applied to the step-wall features of Fresnel lens 112, for example to reduce scatter effects by absorption, reflection, and/or controlled direction and/or controlled scatter. However, such coatings, layers, and/or surfacing are example elements that may be included with or in conjunction with optical relay 100 to achieve desired effects or results, and the scope of the claimed subject matter is not limited in these respects. In one or more embodiments, diffraction effects exhibited by optical relay 100 may be reduced or minimized. For example, in an embodiment of optical relay having an embedded and see through Fresnel lens 112, the spacing of the Fresnel elements of Fresnel lens 112 may be chosen on the order of the diffractive beamlet spacing, or diffraction-limited cone NA, of a pixel within an image plane internal to the projector with which optical relay 100 is utilized in order to diminish the effects of diffraction emanating from optical projector 210, although the scope of the claimed subject matter is not limited in this respect. An example scanned beam head-up display projector capable of utilizing optical relay 100 is shown in and described with respect to FIG. 2, below.

Referring now to FIG. 2, a diagram of a head-up display system utilizing an optical relay in which the displayed image is projected generally on-axis with respect to the optical relay in accordance with one or more embodiments will be discussed. As shown in FIG. 2, head-up display (HUD) system 200 comprises an projector module 210 that may include one or more lasers or LEDs as light sources and may use any means of placing image information onto the projected beam including liquid crystal panels, LCOS, digital micromirror, and scanned beam projection technology with which a image may be projected onto optical relay 100. In one or more embodiments, projector 210 may be disposed at a distance Z from optical relay 100 to image an image plane in the projector into an apparent field of view (FOV), as seen by the viewer's eye 216. The output angle α of the projected beam may be tailored with respect to the acceptance angle of Fresnel lens 112 of optical relay 100 to result in a desired eyebox location along the optical path, while magnification of the resulting image at image plane 218 can be tailored by design of the size of the projector's internal image plane 212, angle α, distance Z from projector 210 to relay, and the effective focal length of optical relay 100. The apparent distance D at which the image plane 218 may be located from viewer's eye 216 may be adjusted by an appropriate selection of the distance Z from optical relay 100 to projector 210 and/or the focal length of Fresnel lens 112, or effective focal length (EFL) of optical relay 100, since the refractive indices $n_1$ and $n_2$ may also play a role in determining EFL in one or more embodiments, or combinations thereof. In such an arrangement, the viewer may observe a combination of the background image 220 with the image displayed by projector 210. In general, the distance D of the image plane 218 and the distance of the background image 220 are selected to be equal, or nearly equal, or at least sufficiently close so that the viewer's eye 216 is not required to make significant focal adjustment when switching between observing the image generated by projector 210 at image plane 218 and background image, although the scope of the claimed subject matter is not limited in this respect. In general, as the distance Z is reduced, the distance D is likewise reduced.

In the embodiment shown in FIG. 2, optical relay 100 may be generally aligned on-axis with the beam projected by projector 210, i.e., the plane of optical relay 100 may be such that its normal bisects the angle between the projector 210 and the viewer 216 and thus be tilted at an angle with respect to the viewer's eye 216. In such an arrangement of optical relay 100, Fresnel lens 112 may have a generally symmetrical arrangement of the Fresnel elements, although the scope of the claimed subject matter is not limited in this respect. Such a tilt of optical relay 100 with respect to the viewer's eye 216 may be utilized, for example, to reduce adverse reflections of light emanating from the same side of optical relay 100 as the viewer's eye 216 is located. Such an angle may be at or near Brewster's angle in one or more embodiments. Furthermore, the background image 220 observed by the viewer's eye 216 may be unmagnified, or nearly unmagnified, or alternatively may be magnified via selection of an appropriate ratio between the index of refraction $n_1$ of filler 120 of optical relay 100 and the index of refraction $n_2$ of the supporting material on the other side of the surface 122 of Fresnel lens 112, however the scope of the claimed subject matter is not limited in this respect. Furthermore, as discussed above, the pitch of the Fresnel elements of Fresnel lens 112 may be selected to be on the order of the size of the beamlets, or diffraction-limited cone NAs, generated by projector 210, which may be for example about 3 mm to about 6 mm or so in some embodiments, to reduce or minimize diffraction artifacts that otherwise may be generated by optical relay 100, although the scope of the claimed subject matter is not limited in this respect.

Referring now to FIG. 3, a diagram of a head-up display system utilizing an optical relay in which the displayed image is projected generally off-axis, i.e., the normal to the optical relay 110 does not bisect the angle between the projector 210 and the viewer 216, in accordance with one or more embodiments will be discussed. In the embodiment of HUD system 200 shown in FIG. 3, the beam generated by projector 210 impinges at an off-axis angle with respect to optical relay 110, and optical relay 110 generally may be aligned on-axis with respect to the viewer's eye 216. In contrast to the arrangement of Fresnel lens 112 in the embodiment shown in FIG. 2, in the embodiment of FIG. 3 Fresnel lens 112 may have a generally asymmetrical arrangement of the Fresnel elements such that the Fresnel elements of Fresnel lens 112 are generally tilted toward projector 210 to compensate for of the off-axis feed of the beam generated by projector 210, although the scope of the claimed subject matter is not limited in this respect. In general, such a tilt of the Fresnel elements of Fresnel lens 112 may be referred to as the lens offset, or lens decenter, or an off-axis section of a Fresnel. The arrangement of optical relay 110 and/or projector 200 as shown in FIG. 3 is substantially similar to the arrangement of optical relay and/or projector 200 as shown in FIG. 2.

Referring now to FIGS. 4A, 4B, and 4C, diagrams of near-to-eye head-up display projectors utilizing an optical relay in accordance with one or more embodiments will be discussed. In the embodiments shown in FIG. 4A, FIG. 4B, and FIG. 4C, a near-to-eye display 400 may be utilized in which optical relay 100 and/or projector 210 are located closer to the viewer's eye than the HUD system 200 shown in FIG. 2 or in FIG. 3. For example, near-to-eye display 400 may be disposed in a helmet, in headgear, or in eyeglasses or similar eyewear worn on or otherwise located near the viewer's head, for example in a periscope, binoculars, or similar devices. For such near-to-eye type displays, Fresnel lens 112 of optical relay 100 may be placed on or in or otherwise integrated within a flat surface or substrate as shown in FIG. 4A, or placed on or in or otherwise integrated with a curved surface or substrate as shown in FIG. 4B. Projector 210 may be located to project from a side location onto optical relay 100 in an eyeglasses type format in the planar embodiment of near-to-eye display of FIG. 4A.

In one or more embodiments, the Z-biasing 416 placement of projector 210 may be adjusted, in combination with the placement of the Fresnel elements of Fresnel lens 112 along with the tilt or lens offset of the Fresnel elements along optical path to reduce or eliminate shadowing and scattering effects due to diffraction and/or to maintain contrast in the projected image. In some instances an aberration-free field of view (FOV) may be desired, therefore in some embodiments such as shown in FIG. 4B two optical surfaces comprising Fresnel lens 112 and curved substrate surface 418 and/or 420 which has a double pass characteristic may be utilized together to result in less aberration in the FOV. In such embodiments, as curvature permits, optical relay 100 of FIG. 4B may add magnification via a difference in the indices of refraction of two or more surfaces, and/or with a curvature of surface 418 and a curvature of surface 420, or combinations thereof, to provide a hybrid Fresnel/non-Fresnel powered optical relay 100, although the scope of the claimed subject matter is not limited in these respects.

In the embodiment shown in FIG. 4C, depending on the arrangement 410 of projector 210, a combiner/splitter 412 may be utilized in a near-to-eye display 400. For example, combiner/splitter 412 may comprise a neutral density or metalized-type beam splitter. Alternatively, combiner/splitter 412 may comprise a polarizing beam splitter (PBS). In such embodiments, optical relay 100 may include a retarder film 414 disposed at or near Fresnel lens 112 in order to maintain high efficiency while utilizing a beam splitter, although the scope of the claimed subject matter is not limited in this respect.

In one or more embodiments, head-up display system 200, and/or near-to-eye head-worn display system 400, may be designed for a range of acceptance for optical relay 100, and is not limited to the fixed angle α of the projector 210. In such projectors, the apparent virtual image can be placed where desired for the particular application of the projectors, and is not limited to an existing physical plane. In one or more embodiments, wavelength-selective filtering may be utilized at the surface 122 of Fresnel lens 112, and/or absorbing dye may be utilized just beyond the surface 122 of Fresnel lens 112 for non-see-through applications that may utilize a relatively thinner relay for reduced glare, for example as utilized in a multiple display region system as discussed with respect to FIG. 5, below. In one or more embodiments, optical relay 100 may be embedded inside a windshield or windscreen for HUD type applications, laminated onto the windshield or windscreen, and/or otherwise disposed between the viewer and the windshield or windscreen, for example in a pull-down headliner, or extendible upwards from a dashboard, or combinations thereof. Furthermore, by utilizing an appropriate coating, optical relay 100 may also be utilized to reduce or eliminate ghosting artifacts. In addition, optical relay 100 may be utilized to minimize or reduce scatter by use of various coatings on the Fresnel elements, or via a selected design of the tilt of the Fresnel elements and/or and Fresnel facet ring z-placement so as to limit light illuminating the Fresnel facet element sidewalls, which optionally may be selected to tradeoff with uniformity of the displayed image by reducing shadowing and/or gapping effects on the reflected light. In addition, optical relay 100 may enable formation of a true exit-pupil forming system for a HUD system or near-to-eye display system. However, these are merely example applications for optical relay 100, and the scope of the claimed subject matter is not limited in these respects.

Referring now to FIG. 5, a diagram of a projector display system having multiple display regions in accordance with one or more embodiments. As shown in FIG. 5, projector display system 500 may comprise all or part of a head-up display (HUD) projector as shown in and described with respect to FIG. 2 and/or FIG. 3. Projector display system 500 may be integrated within a windshield 510 of an automobile or other vehicle, or alternatively may cooperate with a windshield 510, for example as an after market system. Projector display system 500 may include a first display region 512 and a second display region 514. In one or more embodiments, first display region 512 may be transparent, or at least partially transparent, and second display region 514 may be non-transparent, or at least partially non-transparent, although the scope of the claimed subject matter is not limited in this respect. First display region 512 may display various images 516 and 518 that may comprise, for example, vehicle related data such as speed data from a speedometer or miles per gallon data, and so on. In one or more embodiments, first display region 512 may comprise optical relay 100 as described, above, so that the image projected by projector display system 500 in first display region 512 may be located at an apparent distance D from the viewer's eye 216. The projected image may also be at least partially transparent in one or more embodiments, and background images, such as sign 520, tree 522, tree 524, and/or roadway 526, may be visible through first display region 512 while the viewer simultaneously views the displayed image such as image 516 and/or image 518 also viewable in first display region. Furthermore, projector display system 500 may also display additional images, such as image 528 or image 530, in second display region 514, where second display region 514 is not transparent, or at least not as transparent as, first display region 512, for example to help provide a desired level of contrast for viewing the images displayed in second display region 514. For example, image 528 may contain information regarding an upcoming destination that the vehicle is traveling to, and/or image 530 may contain a live camera feed obtained from a rear portion of the vehicle. However, this is merely example image content, and the scope of the claimed subject matter is not limited in this respect.

In one or more embodiments, the multiple display regions of projector display system 500, for example first display region 512 and second display system 514 may comprise different materials optimized to type of content to be displayed in the respective display regions. Projection of the images in the multiple regions may be generated by a single projector or alternatively from multiple projectors. In one or more embodiments, the display region may be divided into at least two or more regions, such as first display region 512 and second display region 514, where two or more of the regions comprise different surfaces, geometries, lenses, magnification, optical relays, and so on, optimized for the type of image content to be displayed in a given regions. Such an arrangement of the multiple display regions for projector display system 500 may allow various display scenarios tailored to the given automobile or other vehicle in which projector display system 500 is deployed. For example, projector display system 500 may be capable of displaying automotive safety information on a more transparent portion of the windshield 510 or other display structure in a Head-Up Display (HUD) mode, for example in first display region 512, wherein the HUD display information is intended to be viewed by the driver while driving the vehicle. Likewise images or video may be displayed on a different section of the same windshield 510 another display area, for example in second display region 514, wherein the images or video are intended to be viewed by a passenger in the vehicle. Such an arrangement of projector display system 500 allows multiple benefits from integrating multiple systems all utilized and viewable from a single location such as a windshield 510 of an automobile or other vehicle. Furthermore, one or more of the multiple display regions of projector display system 500 include speckle reduction technology in the display region of the windshield where such technology would result in a higher quality display solution, for example for HUD type information displayed in first display region 512. In one or more embodiments, the shape of a given display region may be selected based at least in part on the particular application in which projector display system 500 is deployed. Furthermore, any combination of shape, design, and/or other technology addressing needs of the user and/or the particular application could be utilized in combination for such a projector display system 500. It should be noted that these are particular examples of how multiple display regions in projector display system 500 could be implemented, and the scope of the claimed subject matter is not limited in these respects.

Referring now to FIG. 6, a diagram of a projector system having an embedded, at least partially reflective Fresnel or diffractive surface or lens in which one or more surfaces may have curvature in accordance with one or more embodiments will be discussed. In the embodiment shown in FIG. 6, near-to-eye display 400 may comprise an optical relay 100 disposed generally near the viewer's eye 216 and/or nearby projector 210 and the projector's internal image plane 212. In one or more embodiments, additional design degrees of freedom for optical relay 100 may be obtained via utilization of different curvatures and refractive indices in a layered element approach as shown. In such embodiments, the surfaces of the elements of optical relay 100 may have their own respective curvatures wherein the curvatures may be either spherical or aspheric. To minimize diffraction artifacts, the Fresnel pitch of Fresnel element 112 may be selected to be on the order of beamlet size, which may be for example approximately one to two millimeters for a typical near-to-eye display 400. In the case of a laser or non-laser-based one-dimensional scanned or two-dimensional panel display, the Fresnel pitch may be on order of the footprint size as projected at the Fresnel element of a minimum cone numerical aperture (NA) representing the resolvable pixel resolution of the display panel being projected for reduced diffractive artifacts. However, these are merely examples for the Fresnel pitch, and the scope of the claimed subject matter is not limited in these respects.

In one or more embodiments, optical relay 100 may be see-through or may add magnification to see-through via a prescription with overlay. Such a magnification may be achieved via combinations of differences in the respective indices of refraction $n_1$ of layer 116, $n_2$ of filler 120, $n_3$ of filler 120, and/or $n_4$ of layer 114, in selected combinations thereof. Likewise, magnification may be achieved via combinations of curvatures of surface $s_1$ and/or surface $s_2$ of layer 116, surface $s_3$ of Fresnel lens 112, and/or surface $s_4$ and/or surface $s_5$ of layer 114. Furthermore, magnification may be achieved or controlled via any combination of selected refractive indices $n_1$, $n_2$, $n_3$, and/or $n_4$ along with surface curvatures surface $s_1$, $s_2$, $s_3$, $s_4$ and/or $s_5$, although the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to an embedded relay lens for head-up displays or the like and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An optical relay, comprising:
   a lens having an at least partially reflective coating and having a first index of refraction, the lens comprising a Fresnel lens, a diffractive lens, a holographic lens, or combinations thereof, wherein the at least partially reflective coating is a neutral density filter;
   a filler medium having a second index of refraction and being disposed adjacent to the lens, wherein at least one of the lens or the filler medium, or combinations thereof, is at least partially transparent;
   a polarizing beam splitter disposed between the integrated photonics module and the optical relay; and
   a retarder or a beam splitter, or combinations thereof, disposed proximate to the lens.

2. An optical relay as claimed in claim 1, wherein the lens has a generally planar profile, a slightly curved profile, an elliptical curved profile, a spherical curved profiled, or an aspheric curved profile, or combinations thereof.

3. An optical relay as claimed in claim 1, wherein the first index of refraction is equal to or approximately equal to the second index of refraction.

4. An optical relay as claimed in claim 1, wherein the first index of refraction is sufficiently different from the second index of refraction to provide magnification of an image transmitted through the lens.

5. An optical relay as claimed in claim 1, further comprising:
   a first layer and a second layer, wherein the first layer and the second layer are at least partially transparent;
   wherein the lens and the filler medium are disposed between the first layer and the second layer.

6. An optical relay as claimed in claim 1, further comprising:
   a first layer and a second layer, wherein the first layer and the second layer are at least partially transparent;
   wherein the lens and the filler medium are disposed between the first layer and the second layer, and the first layer or the second layer, or combinations thereof, have a curvature to provide magnification to an image transmitted through the lens, wherein the curvature comprises an inner surface of the first layer, an outer surface of the first layer, an inner surface of the second layer, or an outer surface of the second layer, or combinations thereof.

7. A head-up display system for a vehicle, comprising:
   a projector to display a projected image; and
   an optical relay onto which the image is projected from a first side of the optical relay to allow a viewer to view the projected image through the optical relay wherein the virtual projected image is displayed on another side of the optical relay;
   wherein the optical relay comprises:
   a lens having an partially-reflective coating and a first index of refraction, wherein the lens comprises a Fresnel lens, a diffractive lens, or a holographic lens, or combinations thereof, wherein the partially reflective coating is a neutral density filter;
   a filler medium having a second index of refraction and being disposed adjacent to the lens, wherein at least one of the lens or the filler medium, or combinations thereof, is at least partially transparent;
   a polarizing beam splitter disposed between the integrated photonics module and the optical relay; and
   a retarder or a beam splitter, or combinations thereof, disposed proximate to the lens.

8. A head-up display system as claimed in claim 7, wherein the projected beam from the projector is arranged to impinge generally on-axis with respect to the optical relay, wherein the projected beam generally normal to a plane of the optical relay bisects or nearly bisects an angle between the projector and a viewer, and the optical relay is generally tilted with respect to a line of sight of the viewer.

9. A head-up display system as claimed in claim 7, wherein the projected beam from the projector is arranged to impinge generally off-axis with respect to the optical relay, wherein the projected beam normal to the plane of the optical relay does not bisect or nearly bisect an angle between the projector and a viewer, and the optical relay is disposed generally normal with respect to a line of sight of the viewer.

10. A head-up display system as claimed in claim 7, further comprising a windshield, wherein the optical relay is disposed adjacent to the windshield or integrated within the windshield, or combinations thereof.

11. A head-up display system as claimed in claim 7, further comprising a windshield, wherein the windshield has a first display region in which a first type of image may be displayed, and the windshield has a second display region in which a second type of image may be displayed, wherein the optical relay is at least partially disposed within the first display region for displaying the projected image projected by the integrated photonics module.

12. A head-up display system as claimed in claim 7, wherein the lens has a generally planar profile, a slightly curved profile, an elliptical curved profile, a spherical curved profiled, or an aspheric curved profile, or combinations thereof.

13. A head-up display system as claimed in claim 7, wherein the first index of refraction is equal to or approximately equal to the second index of refraction.

14. A head-up display system as claimed in claim 7, wherein the first index of refraction is sufficiently different from the second index of refraction to provide magnification of an image transmitted through the lens.

15. A head-up display system as claimed in claim 7, further comprising:
   a first layer and a second layer, wherein the first layer and the second layer are at least partially transparent;
   wherein the lens and the filler medium are disposed between the first layer and the second layer.

16. A head-up display system as claimed in claim 7, further comprising:
   a first layer and a second layer, wherein the first layer and the second layer are at least partially transparent;
   wherein the lens and the filler medium are disposed between the first layer and the second layer, and the first layer or the second layer, or combinations thereof, have a curvature to provide magnification of an image projected through the lens, wherein the curvature comprises an inner surface of the first layer, an outer surface of the first layer, an inner surface of the second layer, or an outer surface of the second layer, or combinations thereof.

17. A near-to-eye display system, comprising:
   a projector module capable of emitting a projected image; and
   an optical relay onto which the scanned beam is projected from a first side of the optical relay to allow a viewer to view the projected image through the optical relay wherein the projected image is displayed on another side of the optical relay;
   wherein the optical relay comprises:
   a lens having an least partially reflective coating and a first index of refraction, the lens comprising a Fresnel lens, a diffractive lens, or a holographic lens, or combinations thereof, wherein the at least partially reflective coating is a neutral density filter;
   a filler medium having a second index of refraction and being disposed adjacent to the lens, wherein at least one of the lens or the filler medium, or combinations thereof, is at least partially transparent;
   a polarizing beam splitter disposed between the integrated photonics module and the optical relay; and
   a retarder or a beam splitter, or combinations thereof, disposed proximate to the lens.

18. A near-to-eye display system as claimed in claim 17, further comprising:
   a first layer and a second layer, wherein the first layer and the second layer are at least partially transparent;
   wherein the lens and the filler medium are disposed between the first layer and the second layer, and the first layer or the second layer, or combinations thereof, have a curvature to provide magnification of an image transmitted through the optical relay, wherein the curvature comprises an inner surface of the first layer, an outer surface of the first layer, an inner surface of the second layer, or an outer surface of the second layer, or combinations thereof.

19. A near-to-eye display system as claimed in claim 17, wherein a distance between the integrated photonics module and the optical relay is adjustable to allow adjustment of distance at which the projected image appears from the viewer's eye.

* * * * *